No. 610,827. Patented Sept. 13, 1898.
W. PEARL.
AUTOMATIC VEHICLE BRAKE.
(Application filed May 27, 1898.)
(No Model.)

Witnesses William Pearl, Inventor.
By his Attorneys,

THE NORRIS PETERS CO., PHOTO-LITHO., WASHINGTON, D. C.

UNITED STATES PATENT OFFICE.

WILLIAM PEARL, OF FAIRPORT, MISSOURI.

AUTOMATIC VEHICLE-BRAKE.

SPECIFICATION forming part of Letters Patent No. 610,827, dated September 13, 1898.

Application filed May 27, 1898. Serial No. 681,903. (No model.)

*To all whom it may concern:*

Be it known that I, WILLIAM PEARL, a citizen of the United States, residing at Fairport, in the county of De Kalb and State of Missouri, have invented a new and useful Automatic Vehicle-Brake, of which the following is a specification.

The invention relates to improvements in automatic vehicle-brakes.

The object of the present invention is to improve the construction of vehicle-brakes and to provide a simple, strong, and inexpensive one adapted to be readily applied to wagons and various other vehicles and capable of automatically engaging the wheels in descending an incline when a vehicle moves forward on the draft-animals and also when the vehicle stops, thereby enabling the brake to be automatically applied should a vehicle stop in ascending a hill.

The invention consists in the construction and novel combination and arrangement of parts hereinafter fully described, illustrated in the accompanying drawings, and pointed out in the claims hereto appended.

Figure 1:
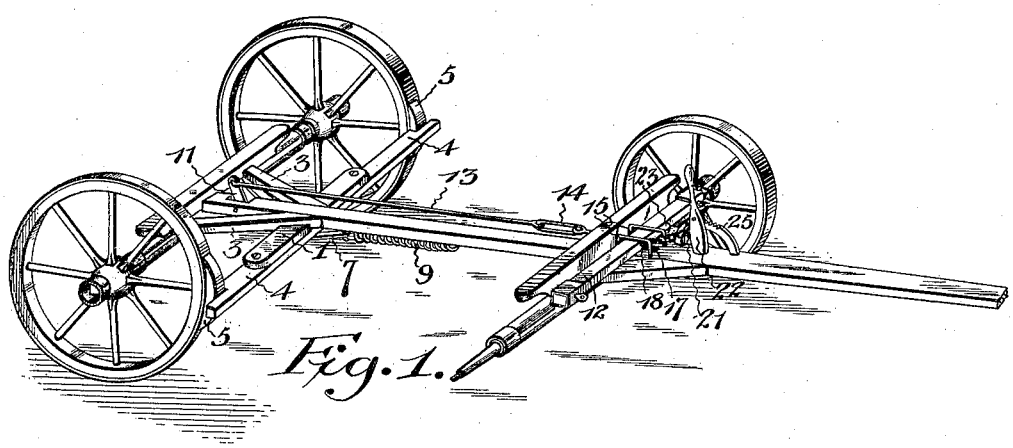
Figure 2:
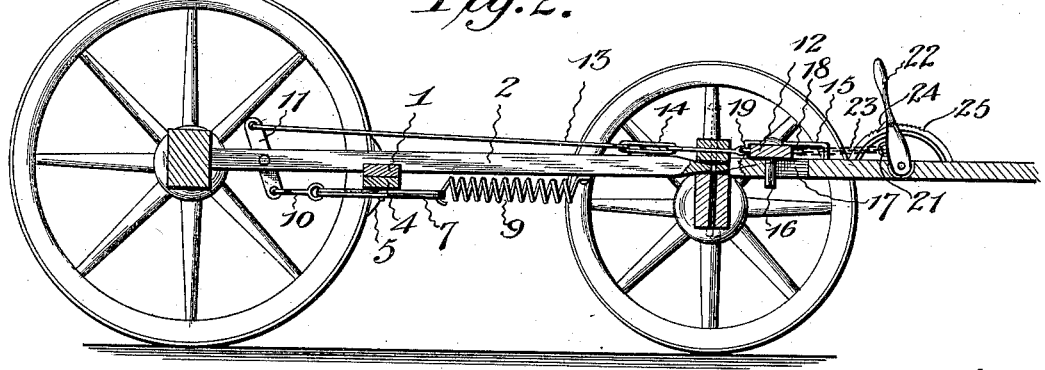
Figures 3, 4:
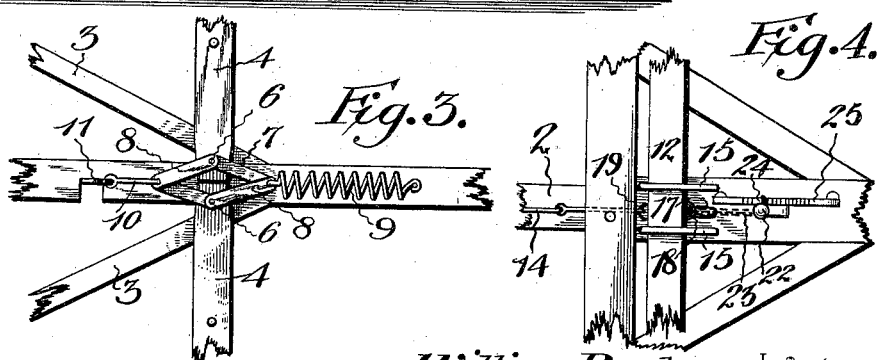

In the drawings, Figure 1 is a perspective view of a portion of a running-gear provided with an automatic brake constructed in accordance with this invention, one of the front wheels of the running-gear being removed. Fig. 2 is a longitudinal sectional view. Fig. 3 is a reverse plan view of a portion of a running-gear. Fig. 4 is a detail plan view of the front portion of the running-gear.

Like numerals of reference designate corresponding parts in all the figures of the drawings.

1 designates a transverse bar mounted on the rear portion of the running-gear and secured to the lower faces of the reach 2 and the rear hounds 3, preferably in recesses thereof, and forming a support for a pair of brake-levers 4. The brake-levers, which are provided at their outer ends with brake-shoes 5, are connected at their inner ends by pivots 6 to opposite sides of a toggle connection 7, composed of front and rear plates or bars 8, arranged as shown. The pivots 6 connect the adjacent inner ends of the front and rear plates or bars, and the latter, which converge from the pivots 6, are pivotally connected at their outer ends.

The front bars of the toggle connection are attached to the rear end of a coiled spring 9, disposed on the lower face of the reach and secured at its front end to the same. This spring automatically applies the brake when the latter is not held out of operation by the draft-animals through the connections hereinafter described, and as soon as the draft-animals cease pulling or when the vehicle moves forward on them incident to traveling downhill the brake will be automatically applied.

The rear plates or bars of the toggle connection are connected by a short wire or rod 10 with the lower end of a lever 11, fulcrumed between its ends on the rear portion of the reach, in a recess thereof, and extending above and below the same. The upper arm of the lever is longer than the lower arm and is connected with a sliding doubletree 12 by a wire or rod 13, composed of two sections connected by a link 14, which is located adjacent to the front axle to enable the vehicle to be turned without bending the wire or rod.

The doubletree, which is mounted in longitudinal guides 15, has its pivot 16 arranged in a longitudinal slot 17 of the rear portion of the tongue or pole, and it is provided with front and rear eyes 18 and 19, the rear eye being connected to the front section of the wire or rod 13. The front eye is connected by a short rod or chain with an eye 21 of a lever 22, and the chain 23, which extends from the lever to the doubletree, may be detached when desired. The lever carries a pawl or dog 24, which engages a curved ratchet 25, mounted upon the tongue or pole, whereby the brake is locked out of operation when it is desired to back the vehicle, grease the wheels, or the like.

The lever is mounted in a slot of the tongue or pole, and the longitudinal guides, which are constructed of suitable metal, are mounted upon the same; but the parts may be mounted in any other suitable manner.

The invention has the following advantages:

The automatic brake, which is simple, inexpensive, strong, and durable, is applicable to wagons and various other vehicles, and it is automatically applied when the draft-animals cease pulling and when the vehicle moves forward on them in descending a hill.

The brake mechanism may be readily locked out of operation when it is desired to back a vehicle or grease the wheel, and the rear lever enables a light pull on the draft-animals to relieve the wheels of the brake-shoes, so that there will be no liability of the brake remaining applied when a vehicle is light and not loaded.

The brake enables the driver to have full use of his hands in managing his team and is especially advantageous when hauling a bulky load which would prevent ready access to an ordinary hand brake-lever.

Changes in the form, proportion, and minor details of construction may be resorted to without departing from the spirit or sacrificing any of the advantages of this invention.

What I claim is—

1. In an automatic vehicle-brake, the combination with a running-gear, of a pair of brake-levers fulcrumed on the running-gear and provided at their outer ends with brake-shoes arranged to engage the hind wheels, the toggle connection composed of outwardly-converging front and rear plates or bars pivoted together at their outer ends, the pivot 6 connecting the adjacent inner ends of the plates or bars and pivoting the same to the inner ends of the brake-levers, a coiled spring mounted on the reach and attached to the front of the toggle connection and adapted to apply the brake, a lever fulcrumed on the reach near the rear end thereof and having its lower end connected with the toggle connection, guides mounted on the running-gear in advance of the front axle, and a doubletree mounted in the guides and connected with the upper end of the said lever, substantially as described.

2. In an automatic vehicle-brake, the combination with a running-gear, of a pair of brake-levers fulcrumed on the running-gear and arranged to engage the hind wheels, a spring for applying the brake-lever, a doubletree mounted in the said guides and connected with the brake-levers, an operating-lever fulcrumed in advance of the doubletree and connected with the same, a curved ratchet, and a pawl mounted on the lever and arranged to engage the ratchet, whereby the brake is locked out of operation, substantially as described.

In testimony that I claim the foregoing as my own I have hereto affixed my signature in the presence of two witnesses.

WILLIAM PEARL.

Witnesses:
 W. F. KIRCHNER,
 S. A. RIGGS.